United States Patent [19]

Lensmire et al.

[11] Patent Number: 4,940,754

[45] Date of Patent: Jul. 10, 1990

[54] EASILY COLORED THERMOPLASTIC MOLDING COMPOSITION

[75] Inventors: Todd T. Lensmire; Robert J. Donald; Sheldon G. Turley; Bruce J. Tallmadge, all of Midland, Mich.

[73] Assignee: The Dow Chemical Company, Midland, Mich.

[21] Appl. No.: 194,759

[22] Filed: May 17, 1988

[51] Int. Cl.$^5$ .............................................. C08L 51/04
[52] U.S. Cl. ..................................... 525/80; 524/529; 524/532; 524/533; 524/534; 525/75; 525/76; 525/84; 525/85
[58] Field of Search ................. 525/80, 75, 76, 84, 525/85

[56] References Cited

U.S. PATENT DOCUMENTS

| | | | |
|---|---|---|---|
| 3,806,556 | 4/1974 | Paleologo et al. | 260/880 |
| 3,985,829 | 10/1976 | Falk | 260/879 |
| 4,083,896 | 4/1978 | Moran et al. | 260/876 |
| 4,097,555 | 6/1978 | Moran | 260/880 |
| 4,113,798 | 9/1978 | Moran | 525/84 |
| 4,230,833 | 10/1980 | Purvis | 525/260 |
| 4,275,177 | 6/1981 | Walkenhoust et al. | 525/53 |
| 4,308,355 | 12/1981 | Tokas | 525/84 |
| 4,330,641 | 5/1982 | Echte et al. | 525/310 |

FOREIGN PATENT DOCUMENTS 0212700  4/1987  European Pat. Off. ............ 212/04

Primary Examiner—Jacob Ziegler
Attorney, Agent, or Firm—D. N. Deline; J. B. Guffey

[57] ABSTRACT

Opaque, thermoplastic molding compositions comprising a grafted rubber phase and a matrix phase comprising styrene, acrylonitrile, and from 1 to 18 percent of a lower alkyl methacrylate and having improved colorability are disclosed.

5 Claims, 3 Drawing Sheets

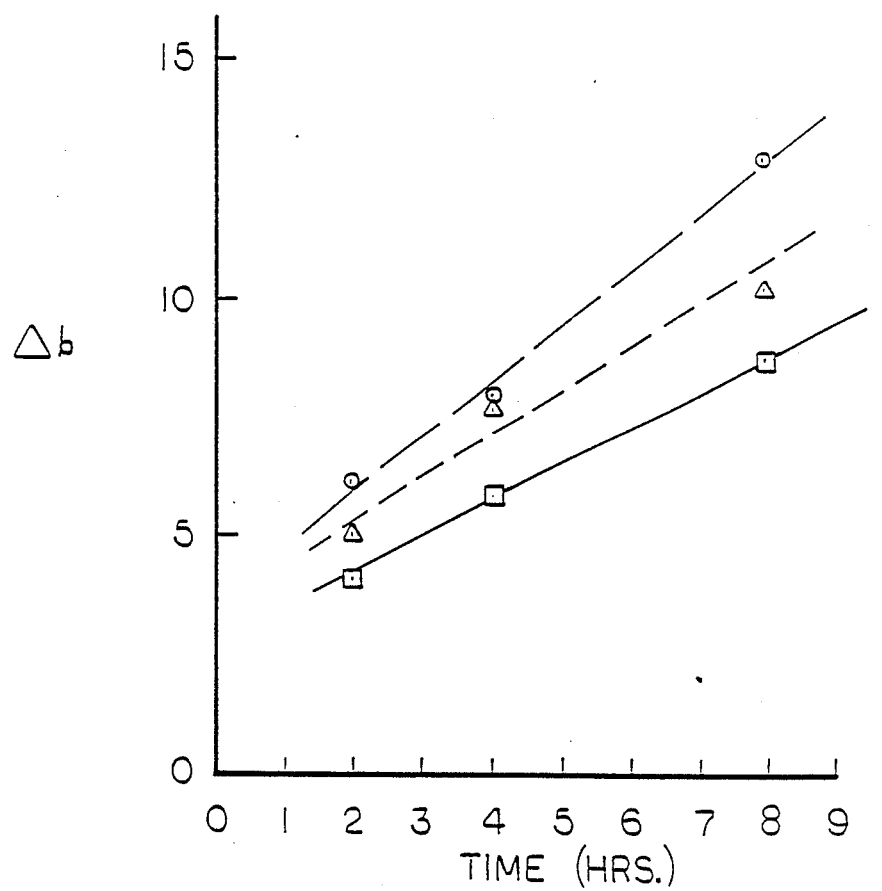

EASILY COLORED THERMOPLASTIC MOLDING COMPOSITION

BACKGROUND OF THE INVENTION

The present invention relates to thermoplastic molding compositions that are usefully employed in the preparation of molded objects. More particularly, the present invention relates to a pigmented, opaque, impact modified thermoplastic molding composition having improved colorability.

It is previously well known in the art to prepare impact modified thermoplastic molding compositions by polymerizing one or more copolymerizable monomers in the presence of a rubbery impact modifying polymer. Suitable processes include the well known emulsion polymerization, as well as mass or solution polymerization techniques. In the former, a latex comprising preformed rubber particles is first formed and monomers to be polymerized as the matrix are later added and polymerized to form one or more layers of grafted, hard phase polymer along with a matrix phase of the same monomer composition. One or more than one additional grafted, hard phase polymers may be polymerized.

Alternatively, the rubber modified molding compositions may be prepared by dissolving the rubber polymer in a solution comprising at least some of the monomers to be polymerized and initiating polymerization under conditions so as to result in the formation of the desired rubber morphology. In particular, it is highly desired to cause the polymerizing mixture to phase invert and thereby achieve an occluded and grafted rubber particle morphology.

The impact modified thermoplastic molding compositions prepared according to the foregoing techniques may employ a variety of polymerizable monomers in order to prepare compositions having desired end use properties. Particularly desirable properties of solvent resistance and ease in moldability are obtained where the polymerizable monomers comprise styrene and acrylonitrile. The resulting compositions are referred to as ABS resins where the rubbery polymer employed is a homopolymer or copolymer of butadiene. Such compositions employing an EPDM rubber are referred to as AES resins. Compositions employing an acrylate rubber such as a homopolymer or copolymer of n-butyl acrylate are referred to commonly as ASA resins.

Solvent resistance for a polymer may be determined by the solubility parameter for such resin as is well known in the art and disclosed for example in J. Brandrup, et al. Polymer Handbook, 2nd Ed. Wiley-Intrescience p. IV-337 (1975). Such solubility parameters, $\delta$, expressed as $[cal/cm^3]^{\frac{1}{2}}$ are calculated from measurements of polymer density, $p$, in $g/cm^3$ and polymer weight fraction, $\omega$, according to the formula:

$$\delta_{total} = \frac{\delta_{ps}[1-\omega_a-\omega_m)/\rho_{ps}] + \delta_{pm}(\omega_m/\rho_{pm}) + \delta_{pa}(\omega_a/\rho_{pa})}{(1-\omega_a-\omega_m)/\rho_{ps} + \omega_m/\rho_{pm} + \omega_a/\rho_{pa}}$$

wherein:
$\omega_a$ = weight fraction of acrylonitrile in rigid phase
$\omega_m$ = weight fraction of methylmethacrylate in rigid phase
$\rho_{ps}$ = density of polystyrene (1.08 g/cm$^3$)
$\rho_{pa}$ = density of polyacrylonitrile (1.18 g/cm$^3$)
$\rho_{pm}$ = density of polymethylmethacrylate (1.18 g/cm$^3$)
$\delta_{ps}$ = solubility parameter of polystyrene
$\delta_{pm}$ solubility parameter of polymethylemethacrylate
$\delta_{pa}$ = solubility parameter of polyacrylonitrile Ideally, the solubility parameter is between the values of 9.90 and 9.70 for styrene and acrylonitrile containing copolymers and most preferable between about 9.85 and 9.75. Within such range the polymers possess exceptional resistance to a wide variety of solvents.

The preceding styrene/acrylonitrile based molding resins have enjoyed enormous commercial success. Such resins are employed in numerous end use applications requiring chemical resistance toughness and ease of moldability. Due to the presence of the particulated rubbery morphology, such resins are inherently opaque or extremely hazy. Such opacity or haze is due to the fact that the differing polymeric phases possess different refractive indices. In order to provide a uniformly colored molded object, it is standard practice to incorporate suitable pigments or colorants into the impact modified thermoplastic molding compositions currently available.

The resulting molded object contains pigment or colorant uniformly and homogeneously dispersed throughout the entire molded object. Because the inherent opacity or haziness of the resin, the large quantities of pigment or colorant located deep in the interior of the molded object do not contribute to the observed color of the final object and in fact represent an unavoidable waste of pigment. For all practical purposes, a pigmented thermoplastic molded object has a color determined solely by the pigment contained in the resin closest to the surface. Thus, it is seen that deep coloration of existing thermoplastic molding compositions requires the use of relatively excessive amounts of pigment since only the pigment contained in a thin layer close to the outer surface effectively contributes to the perceived coloration of the resulting object.

The foregoing may be stated in the alternative as considering polymer pigmentation to involve the additive result of coloration due to the desired pigment combined with the whitening effect due to the rubber particles. Dark color tones require the use of larger amounts of pigment due to the presence of the white rubber particles that act as white pigments. Besides considerations of cost in the use of excessive amounts of pigments it is desirable in order to achieve optimum physical properties in the resulting resin, particularly impact strength and elongation, that reduced amounts of pigment be utilized.

It would be desirable if there were provided a thermoplastic, rubber modified, acrylonitrile containing molding resin having improved colorability. That is, it would be desirable if there were provided a thermoplastic molding resin whereby the same degree of coloration may be obtained by the use of a reduced quantity of pigment compared with a resin wherein the matrix consists of styrene and acrylonitrile only. This ease of colorability of a given resin may be defined by the term "Opacity Factor", which for the present resins is defined as the absolute value of the difference between the refractive index of the matrix and the refractive index of the rubber. Resins having the same opacity factor may be colored to the same degree of coloration (i.e. color matched to the same standard) by use of the same amount of pigment.

An extensive literature exists concerning the preparation of transparent impact resistant thermoplastic molding compositions. Examples are contained in C. B. Bucknall, *Toughened Plastics,* Applied Science Publishers, Ltd., page 51, and Bower, et al., *Resins with Diene Elastomers, Multicomponent Polymer Systems, Advances in Chemistry Series,* No. 99, American Chemical Society (1971) at page 247. Such transparent interpolymers typically possess a compositional range of from 11 to 18 percent of a 1,3-polybutadiene rubber, 34 to 39 percent styrene, and 23 to 25 percent each of acrylonitrile and methylmethacrylate.

Obviously, the technique of pigmenting and coloring a resin in order to thereby render such resin opaque is directly contrary to the technique of producing a relatively transparent impact resistance thermoplastic molding composition. Accordingly, for purposes of maintaining opacity to a sufficient degree to prepare solid molded objects which appear visually opaque, it will be readily appreciated that matching of the refractive indices of the matrix and the rubber phase is not suggested by the aforementioned teachings regarding transparent molding compositions.

Additionally, the presence of both methylmethacrylate and acrylonitrile monomers in a copolymer results in instability in the resulting resin. At elevated temperatures such as are encountered in a devolatilizer during recovery of the polymer from a polymerization process, polymer degradation can result thereby producing a color change in the resin. The discoloration or yellowing of the polymer may be quantified by the value, b, according to ASTM E308-85, and for such a yellow shift is always a positive value. The amount of change in the yellowness index ($\Delta b$) is desirably less than 11.0 and preferably less than 9.0 when measured by the above technique, in order to not result in significant yellowness in the final product.

BRIEF DESCRIPTION OF THE DRAWINGS

FIG. 3 demonstrates the heat stability measured via ASTM E308-85 of two resins according to the invention and one comparative resin.

SUMMARY OF THE INVENTION

Figure 1:
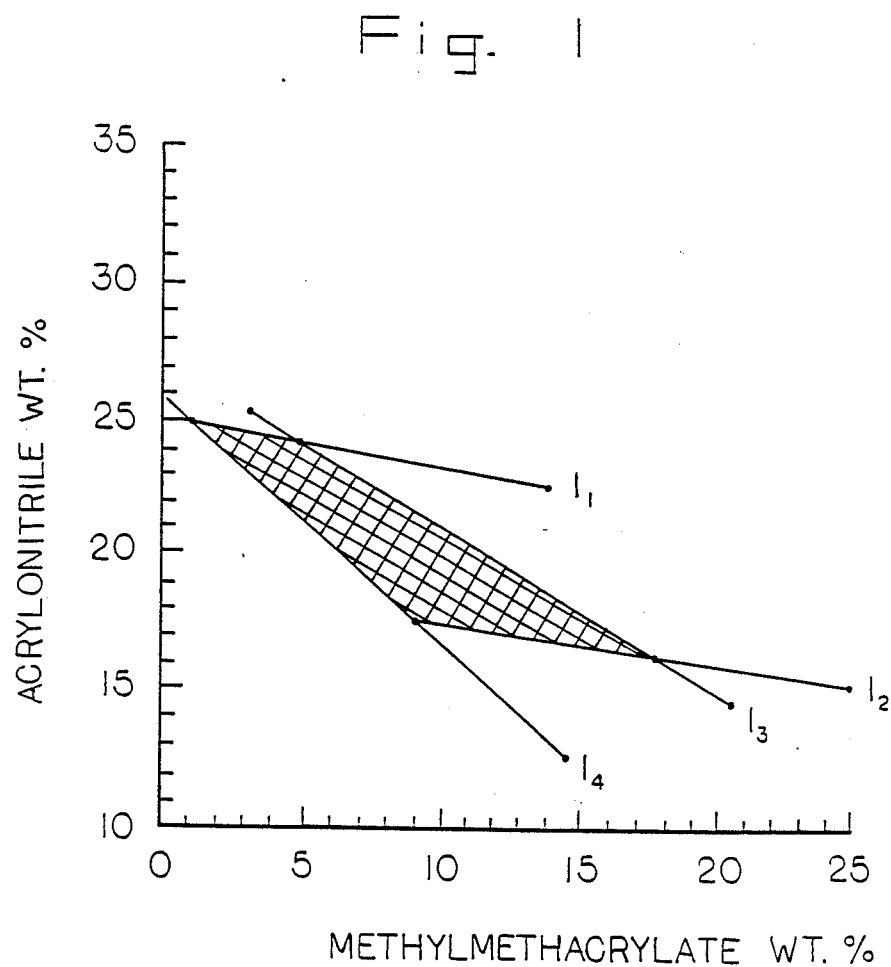
FIG. 1 is a graph showing the composition of the invention as a function of acrylonitrile and methylmethacrylate content of the rigid phase with any remaining monomer component of the rigid phase consisting of styrene. Depicted in the diagram are compositional boundaries where the solubility parameter, $\delta$, equals 9.90 ($l_1$), and 9.70 ($l_2$) respectively. Also depicted is the compositional boundary wherein thermal stability (ASTM E-308-85) after heating for 8 hours at 150° C. gives a $\Delta b$ of 11 ($l_3$), and the compositional boundary for resins having an opacity factor equal to 0.052 ($l_4$). Compositions of the invention are within the quadralateral figure bounded by $l_1$, $l_2$, $l_3$ and $l_4$.
Figure 2:
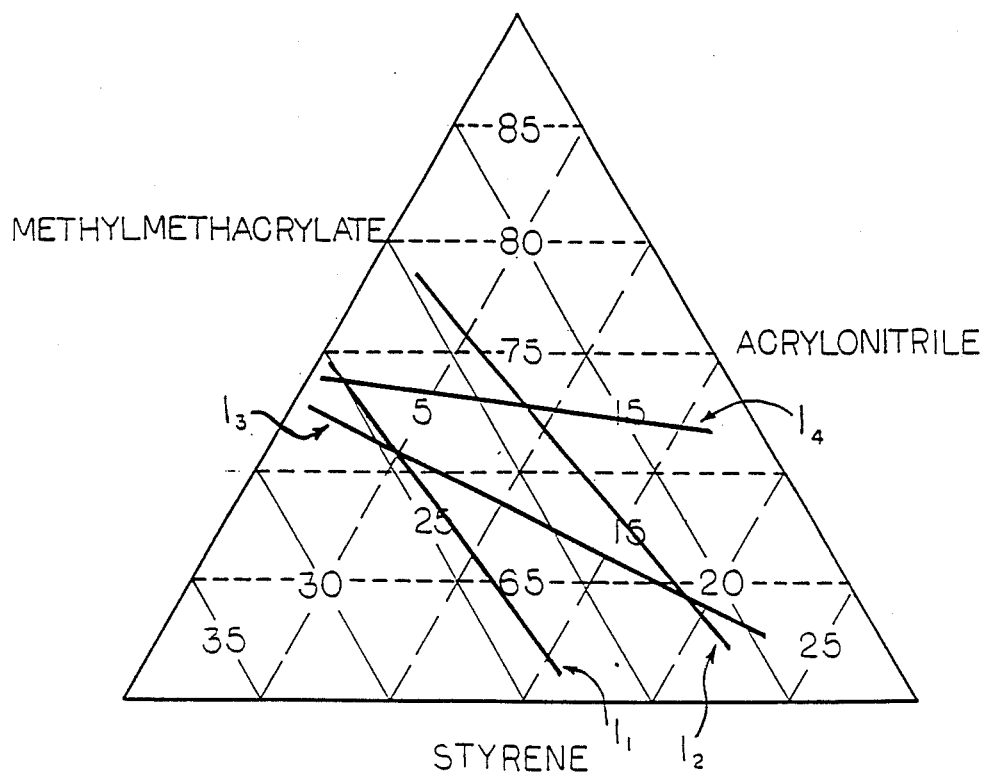
FIG. 2 discloses in triangular coordinate form compositions of the invention. Also disclosed are lines $l_1$, $l_2$, $l_3$ and $l_4$ and compositions according to the present invention.

According to the present invention there is now provided a pigmented, opaque thermoplastic molding composition comprising:
A. 95–80 percent of a matrix phase comprising, in polymerized form, from about 75–65 percent styrene, 25–15 percent acrylonitrile and 1–18 percent of a lower alkyl methacrylate: and
B. 5 to 20 percent of a grafted rubber phase obtained by polymerizing styrene, acrylonitrile and a lower alkyl methacrylate in the presence of a rubbery polymer, said composition having a solubility parameter, $\rho$, from 9.90 to 9.70 $[cal/cm^3]^{\frac{1}{2}}$, thermal stability so as to result in a yellowness color change, $\Delta b$, measured according to ASTM E308-85 after heating in air for 8 hours at 150° C. of less than 11, and an opacity factor of 0.052 or less.

DETAILED DESCRIPTION OF THE INVENTION

The thermoplastic molding compositions of the present invention are prepared according to one of the previously disclosed techniques of graft polymerization. Preferably, the invented compositions are prepared by mass or solution polymerization. A preferred polymerization process comprises a continuous mass polymerization. Such processes have been previously taught in the art for example in U.S. Pat. No. 3,903,202 the teachings of which are incorporated herein in their entirety by reference thereto. Preferred compositions are those having solubility parameters from 9.85 to 9.75. Also preferred are those compositions wherein the lower alkyl methacrylate is methylmethacrylate.

The rubbers for use according to the present invention have a glass transition temperature less than about 0° C. and preferably less than about $-25°$ C. as determined by ASTM Test D-746-52T. Examples include the well known diene homopolymers and copolymers, EPDM rubbers, acrylate rubbers, polypiperylene, polychloroprene, etc. Preferred rubbers are homopolymers and copolymers of conjugated 1,3-dienes and especially homopolymers of butadiene and copolymers thereof with one or more copolymerizable monoethylenically unsaturated monomers, especially styrene.

A small amount, up to about 2 percent by weight of a crosslinking agent may be additionally present in the rubber although such crosslinking agents are generally not preferred due to the fact that dissolution of crosslinked rubbers in a mass or solution polymerization process may be adversely affected thereby. Suitable crosslinkers include divinyl benzene and a diallyl containing compound such as diallyl maleate, diallyl fumarate, etc.

Particularly advantageous rubbers include butadiene homopolymers and copolymers of butadiene with 5 to 10 percent by weight of acrylonitrile or styrene. The copolymers may be either in block or random form and may be hydrogenated to remove residual unsaturation. Mixtures of rubbery polymers may also be employed.

In the preparation of the polymers according to the present invention, it is desirable to dissolve the rubbery polymer in a mixture of the monomers and optionally an inert diluent and initiating polymerization. The amount of monomers is selected so as to prepare the resulting compositions having the desired ratio of monomer ingredients. Optionally, one or more of the reactive monomers may be continuously added throughout the polymerization. For example styrene monomer may be added during later stages of a continuous mass polymerization as is previously known in the art. Suitably, the monomers are reacted in a ratio from about 40 to about 75 percent styrene, 15 to 25 percent acrylonitrile, and 1 to 20 percent of a lower alkyl methacrylate. Suitably, from about 1 to about 20 percent, preferably from 5 to 15 percent by weight of the rubbery polymer may be incorporated in the polymerization process.

The polymerization is conducted utilizing well known free radical polymerization techniques. Suitable, a free radical generating catalyst may be used for improved efficiency. Highly desirable catalysts include the well known peroxide initiators such a ditertiary butyl peroxide, benzoyl peroxide, etc. Generally such free radical inducing catalysts are employed in an amount from about 0.001 to about 0.1 percent by weight in the reaction mixture.

As is well known, other desirable ingredients may be included in the reaction mixture including molecular weight regulators such as mercaptans, halides, etc., in an amount from about 0.001 to about 1 percent by weight of the polymerizable mixture. Small amounts of antioxidants, stabilizers, lubricants, and other additives may be incorporated in the polymerization mixture as well.

In a mass or solution polymerization, it is desirable to provide agitation of a amount sufficient to cause phase inversion of the reaction mixture. Subsequent agitation and other techniques well known in the art may be employed to provide rubber particle sizing and grafting of any desired degree.

The amount and size of the dispersed rubber phase may be adjusted so as to modify properties of toughness and gloss. Generally, improved toughness is obtained by preparation of large sized rubber particles whereas gloss is improved by incorporation of smaller sized rubber particles. The optimum rubber particle size may be adjusted in order to obtain the desired balance of impact strength and gloss. Under some circumstances it may be further desirable to provide more than one size rubber particle. This may be accomplished by blending additional quantities of grafted rubber particles in the completely polymerized product, by blending additional quantities of a rubber containing solution into a partially polymerized mixture and continuing polymerization, or by other techniques well known in the art.

The desired pigments and colorants may be added to the compositions of the invention according to well known techniques. Suitably, the recovered, devolatilized, and dried rubber containing product is blended with the desired amount of pigment or colorant in a suitable mixing and blending device. After incorporation of the desired amount of pigment, the rubber containing product may be extruded and passed through a strand die, cooled, and chopped to provide a granulated product.

As a general rule, the thermoplastic molding compositions prepared according to the present invention may be colored by the use of reduced amounts of pigments or colorants yet achieve an equivalent degree of coloration compared to rubber modified styrene/acrylonitrile resins. Generally, amounts of pigments from ½ to about ⅓ less than the amount required to color a conventional rubber modified styrene/acrylonitrile polymer are employed. Generally, molded objects prepared from the compositions of the present invention retain opacity (i.e. a transmittance of less than 1 percent) in thin sections of one mm or greater.

The improved colorability of the present resins is due to the fact that ordinarily rubber particles act as a type of white pigment in the resin. Because the refractive index of the rubber particles is not extremely different from that of the resin matrix phase these particles are not particularly effective as pigments. Accordingly, adding light absorbing colorants can cancel the whitening effect of the rubber particles. However, for the attainment of deep, rich, dark colors the presence of such white rubber particles is undesired and counterproductive. Instead of masking such rubber particles with increased amounts of pigment the present invention employs a refractive index modification to reduce, but not eliminate, the pigmenting abilities of the rubber particles.

Having described the invention, the following examples are provided as further illustrative and are not to be construed as limiting. Unless indicated to the contrary, all parts and percentages are based on weight.

EXAMPLE 1

A continuous solution polymerization process is conducted utilizing three well-stirred reactors connected in series. Each reactor is capable of holding 2.8 lbs of reaction mixture and all operate at full volumetric capacity. A monomer feed stream comprising styrene (53.4 percent), acrylonitrile (14.1 percent), and methylmethacrylate (9.9 percent) containing dissolved therein 8.4 percent polybutadiene rubber (Diene 55, available from the Firestone Tire and Rubber Company), 14.0 percent ethylbenzene solvent, 0.2 percent hindered phenolic antioxidant (Irganox 1076) and 150 parts/million peroxide initiator, 1,1-bis(t-butyl peroxy)cyclohexane, is introduced to the first reactor at a rate of 1.0 lbs./hr. The first reactor is maintained at an average temperature of 106° C. with stirring. Phase inversion occurs within the first reactor and the effluent is charged to the second reactor in the series. Polymerization is continued with stirring in the second reactor. The temperature of the second reactor is maintained at about 130° C. The product from the second reactor is further charged to a third reactor maintained at a temperature of about 155° C. The final product was devolatilized to remove monomers and solvent and pelletized. Results of the analysis of the resulting polymer are indicated in Table I. The rubber volume average particle size was 1 56 μ.

TABLE I

| Styrene | Acrylonitrile | Methylmethacrylate | Rubber |
|---|---|---|---|
| | Polymer Composition (%) | | |
| 61.90 | 1 | 10.9 | 10.2 |
| | Matrix Phase Composition | | |
| 68.9 | 18.9 | 12.1 | |

Injection molded parts were prepared using standard injection molding equipment. Resin temperature was 425°–450° F., mold temperature 80° F. The properties of the resulting molded parts were measured and are contained in Table II.

TABLE II

| Izod Impact[1] | | Tensile Strength[2] | Gloss[3] | DTUL[4] |
|---|---|---|---|---|
| +25° C. | −20° C. | | | |
| 2.4 | 1.2 | 5,000 | 41 | 129 |

[1]Notched Izod Impact, ASTM D-256, ft. lbs./in.
[2]ASTM D-638, lbs/in².
[3]60° Gardner Gloss, ASTM D-523.
[4]Distortion Temperature Under Load, ASTM D-688, °C.

As may be determined by analysis of the above results, satisfactory molding properties are obtained in molded objects comprising the composition according to the present invention. Opacity factor of the above resin was about 0.050, and the Solubility Parameter was 9.75.

The amount of pigment employed to color compositions of the present invention is approximately 50 percent less than would be required in preparing a pigmented opaque thermoplastic ABS molding composition having the same depth of color as determined according to the CIELAB color system, specular included, 10° observer, D65 illuminant measure of L values.

EXAMPLES 2, 3 AND COMPARATIVE EXAMPLE

The reaction conditions of Example 1 are substantially repeated in order to prepare a composition containing approximately 10% rubber. The matrix phase consists of about 11% methylmethacrylate and 21% (Example 2), 19% (Example 3) or 23.5% (comparative example) of acrylonitrile. When heated for 8 hours at 150° C. in air and tested for color stability according to ASTM E-308-85, Examples 2 and 3 demonstrate a Δb of 10.4, 8.8 and 13.1 respectively. These thermal stability results are plotted in graph form in FIG. 3.

What is claimed is:

1. A pigmented, opaque thermoplastic molding composition comprising:
   A. 95–80 percent of a matrix phase comprising, in polymerized form, from about 75–65 percent styrene, 25–15 percent acrylonitrile and 1–18 percent of a lower alkyl methacrylate; and
   B. 5 to 20 percent of a grafted rubber phase obtained by polymerizing styrene, acrylonitrile and a lower alkyl methacrylate in the presence of a rubbery polymer, said composition having a solubility parameter from 9.90 to 9.70 $[cal/cm^3]^{\frac{1}{2}}$, thermal stability so as to result in a yellowness color change, Δb, measured according to ASTM E308-85 after heating in air for 8 hours at 150° C. of less than 11, and an opacity factor of 0.052 or less.

2. A composition according to claim 1 wherein the lower alkyl methacrylate is methyl methacrylate.

3. A composition according to claim 1 wherein the rubbery polymer is a homopolymer of butadiene or a copolymer thereof with up to 15 weight percent acrylonitrile or styrene.

4. A composition according to claim 1 wherein the matrix phase and grafted rubber phase are prepared simultaneously by a mass or solution polymerization process.

5. A composition according to claim 1 having solubility parameter from 9.85 to 9.75.

* * * * *